United States Patent Office.

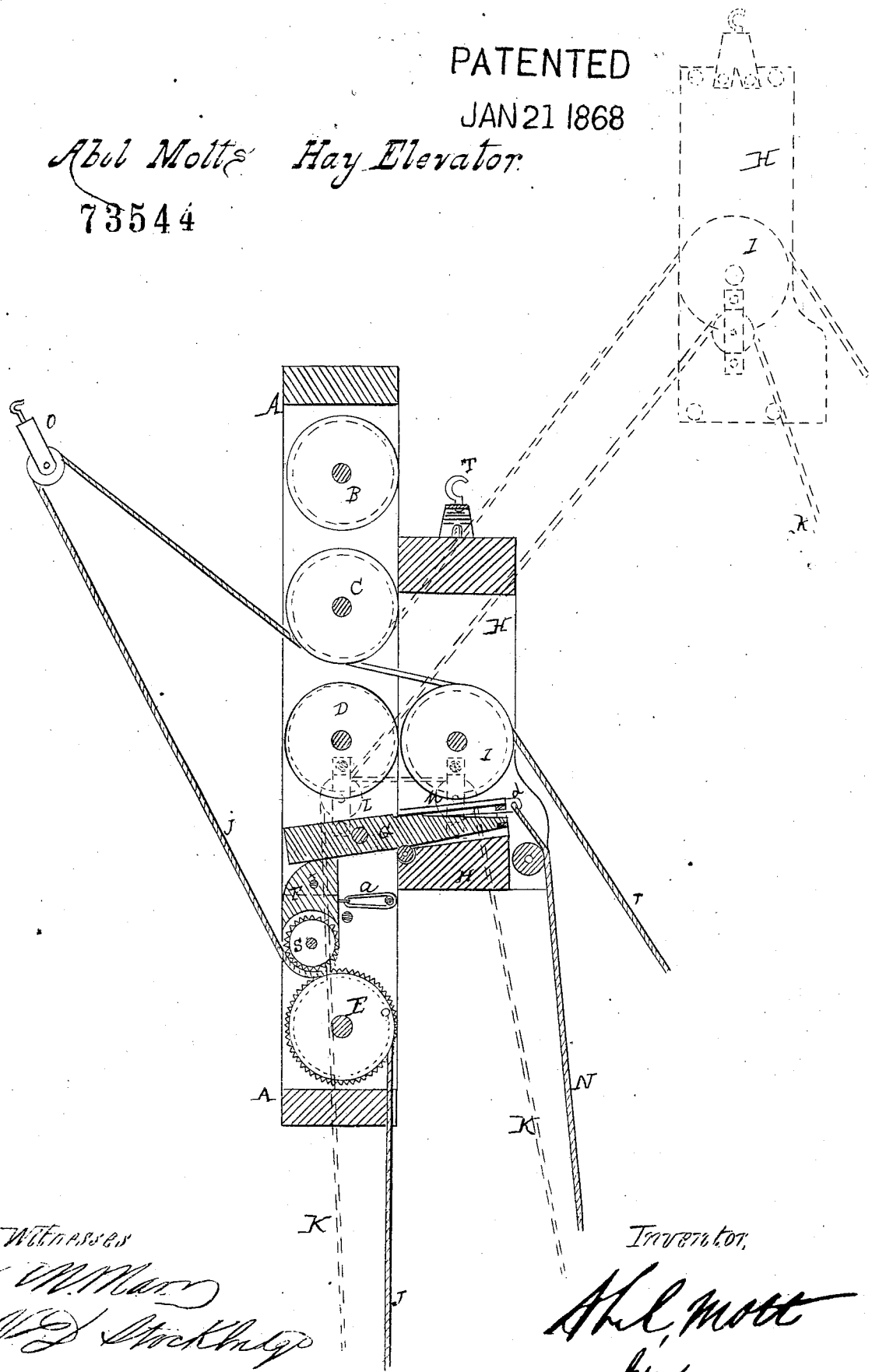
Abel Mott's Hay Elevator.
73544
PATENTED
JAN 21 1868

ABIL MOTT, OF SCOTT, NEW YORK, ASSIGNOR TO HIMSELF AND WARREN KENYON, OF SAME PLACE.

Letters Patent No. 73,544, dated January 21, 1868.

IMPROVEMENT IN HAY-ELEVATORS.

The Schedule referred to in these Letters Patent and making part of the same.

TO ALL WHOM IT MAY CONCERN:

Be it known that I, ABIL MOTT, of Scott, in the county of Cortland, and in the State of New York, have invented certain new and useful "Improvements in Hay-Elevators;" and do hereby declare that the following is a full, clear, and exact description thereof, reference being had to the accompanying drawings, and to the letters of reference marked thereon.

In the annexed drawings, making part of this specification, A and H represent two frames or pulley-blocks. The frame A is provided with the pulleys B, C, D, and E, which are placed within it, and with a pulley. L, seen in red lines, which is secured in bearings upon its outside. Within the frame A is pivoted a small frame, F, which carries a pulley, S, which is corrugated or roughened in its groove. The frame is so situated that its pulley stands immediately over the pulley E of frame A, and it is retained in this position by a spring, $a$, unless forced out, as will be hereinafter described. G represents a stout pin, which is pivoted in the frame A, but having one end, which projects out from said frame, said end being provided with a spring, $d$, at the outer end of which is an eye, and near it a notch. The eye is intended to retain the end of a cord, N. H represents the other frame, which is provided, between its sides, with a pulley, I, and upon its outside with a pulley, M. This frame has an opening in it to receive the pin G of frame A. On the upper end of frame H is a hook, T.

This machine is intended for elevating hay to the mow or stack, and for placing it in any desired position in the mow or stack. In using it the frame H (if used for a mow) is secured by its hook permanently near the top of the mow, and a pulley-block, O, is secured near the top but opposite side of the mow. The hay-rake or clutch is secured to the lower end of a rope, J. This rope then passes up between pulleys E and S, then up and around the pulley of block O, then back and under pulley C, then up and over pulley I of frame H, and then down and around any fixed pulley, so that horse-power can be applied to its end. When hay has been caught upon the rake or clutch attached to one end of cord J, and the horse at the other end of said cord is caused to draw upon said cord, the frame ascends until its pin G comes opposite the hole to receive it in frame H, and being made to enter said hole, it is then caught and held by its spring $a$. A cord, K, seen in red lines, one end of which is secured to the rake or clutch, and which passes around the pulleys L and M, is then used to swing the rake or clutch to any desired point in the mow, where it is to be deposited. As soon as the rake has been relieved of its load, a cord, N, which is attached to spring $a$, loosens said spring, and allows the pin G to draw out of frame H, so that the frame A may descend for another load of hay. When the frame A is drawing up, the frame F turns on its pivot, so that the pulley S will not bind the cord J, but as soon as the frame A is raised to the height it is designed to go, the said frame F resumes its position, and cord J is bound firmly between the pulleys S and E, so as to retain the load of hay without strain upon the horse. A tight cord may be used in the top of the barn, and passed under pulley B of frame A, and said frame may be run upon said cord for carrying hay to different parts of the mow.

Having thus fully described my invention, what I claim, is—

The frames A and H, with their cords and pulleys, the frame F, and pin G, constructed and used substantially as and for the purpose set forth.

In testimony that I claim the foregoing, I have hereunto set my hand, this 3d day of May, 1867.

ABIL MOTT.

Witnesses:
CHAS. FOSTER,
R. H. DUELL.